Dec. 29, 1925.
1,567,375
J. P. McCASLIN
BAR SCRAPING APPARATUS FOR ROLLING MILLS
Filed Sept. 7, 1922
3 Sheets-Sheet 1
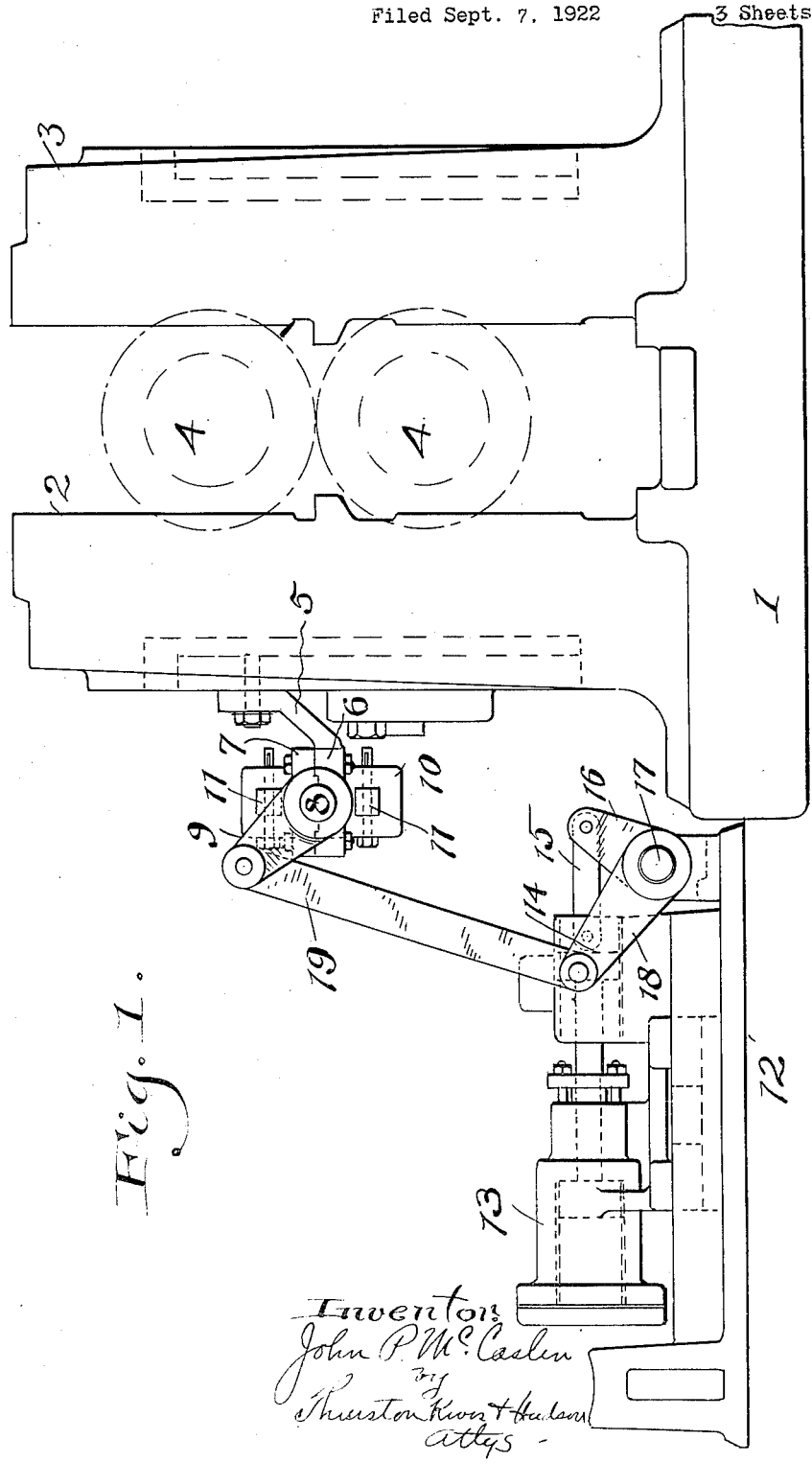

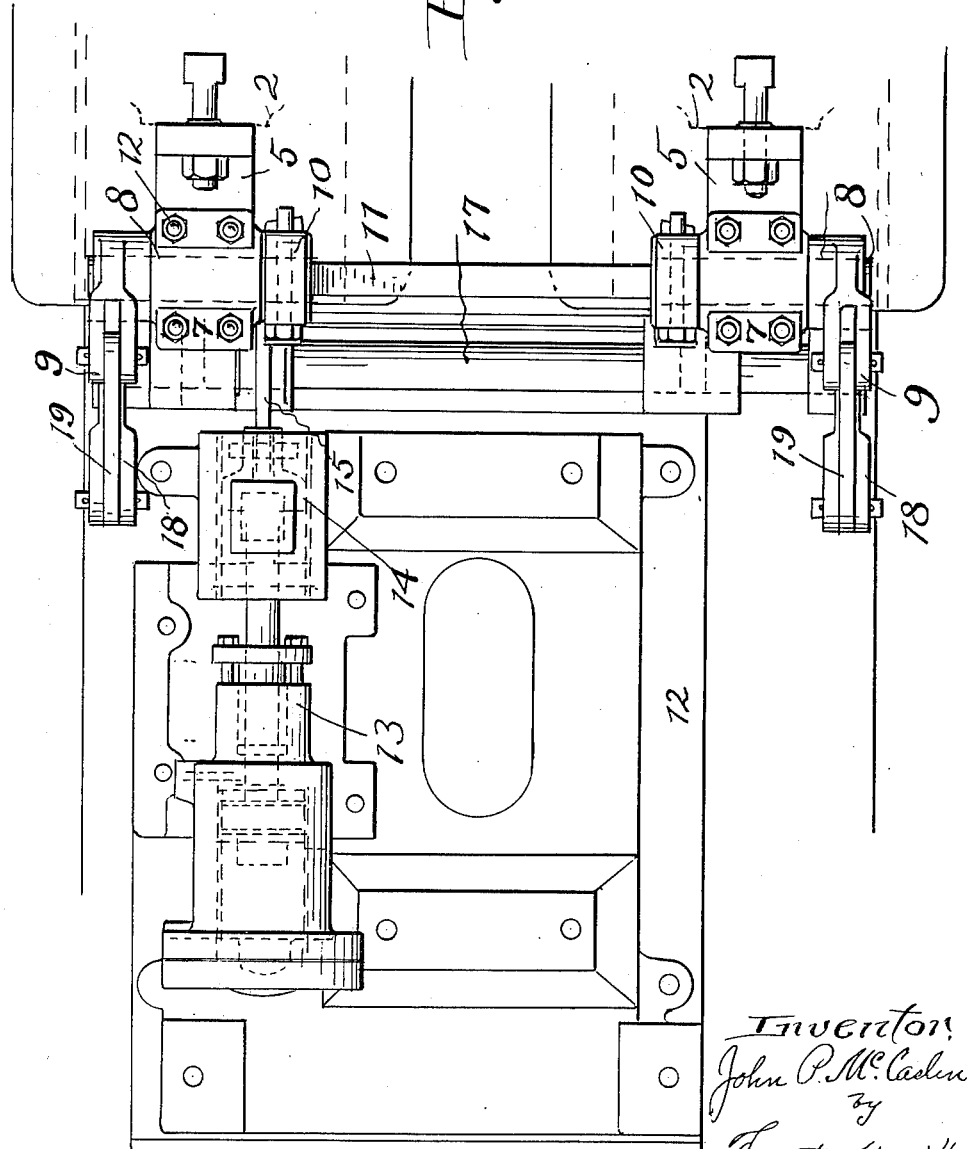

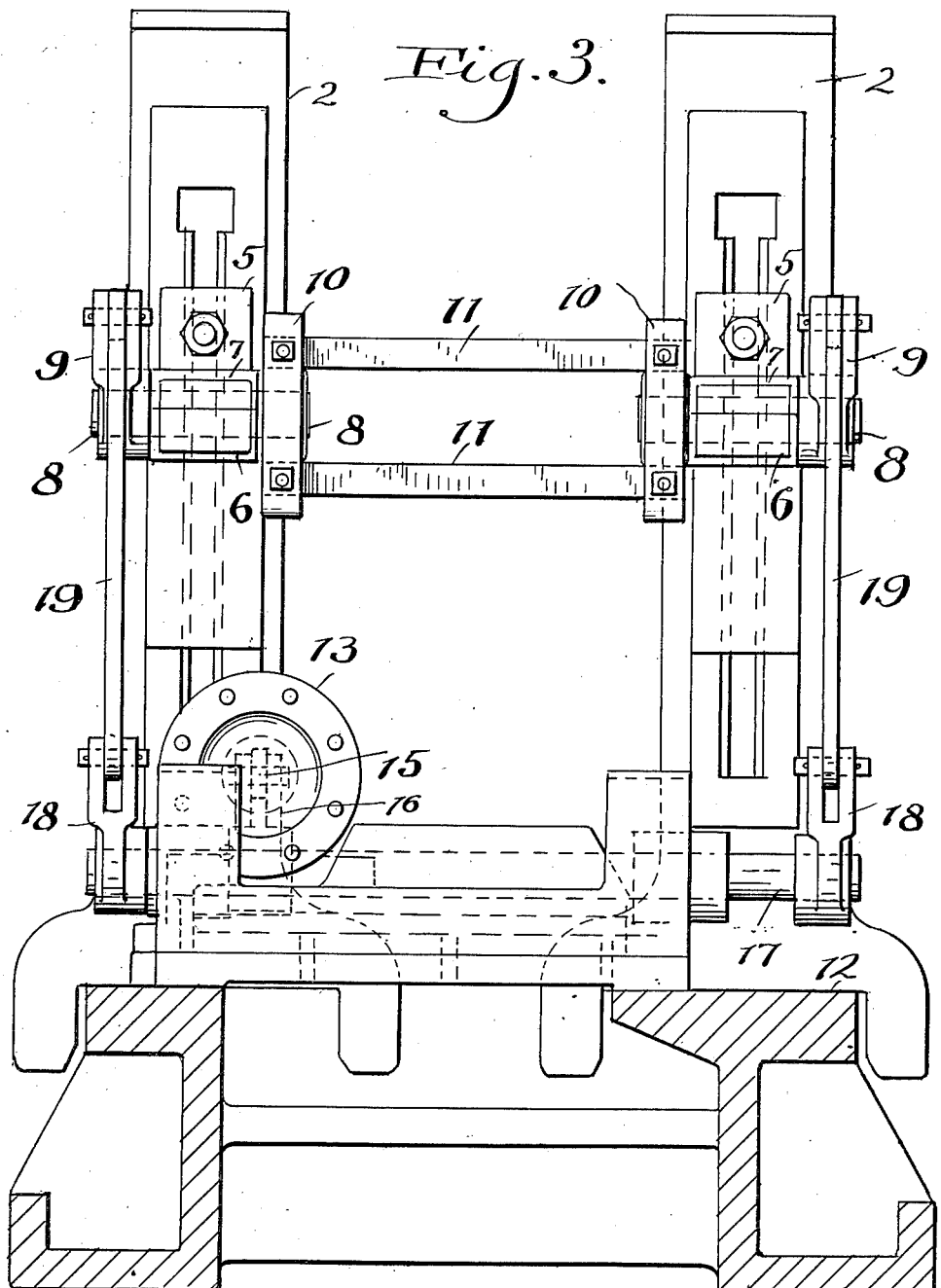

Patented Dec. 29, 1925.

1,567,375

UNITED STATES PATENT OFFICE.

JOHN P. McCASLIN, OF LAKEWOOD, OHIO, ASSIGNOR TO THE McKINNEY STEEL COMPANY, OF CLEVELAND, OHIO, A CORPORATION OF OHIO.

BAR-SCRAPING APPARATUS FOR ROLLING MILLS.

Application filed September 7, 1922. Serial No. 586,631.

*To all whom it may concern:*

Be it known that I, JOHN P. McCASLIN, a citizen of the United States, residing at Lakewood, in the county of Cuyahoga and State of Ohio, have invented a certain new and useful Improvement in Bar-Scraping Apparatus for Rolling Mills, of which the following is a full, clear, and exact description.

The present invention relates to an apparatus which may be termed a bar scraping apparatus for use in connection with rolling mill rolls.

The purpose of the apparatus is to engage with a bar or sheet bar, which is being rolled, to scrape the scale and other adhering material from the bar previous to its passage through a pair of rolls.

The particular object of the present invention is to provide an apparatus for the purpose which is so constituted that it may accommodate itself to the looped condition of the bar or sheet bar as it passes from one stand of rolls to another, the apparatus being adjustable to accommodate the looped portion mentioned and at the same time effectively function as a scraping apparatus.

Reference should be had to the accompanying drawings forming a part of this specification in which Fig. 1 is a side elevation of the invention attached to a standard, said standard and rolls being shown diagrammatically, and parts not essential to the invention being omitted; Fig. 2 is a plan view; and Fig. 3 is an end elevation of the machine.

Referring to the drawings, 1 represents the base on which are mounted pairs of standards 2 and 3 in which are mounted a pair of rolls such as indicated at 4. The construction and arrangement of the rolls and the standards which support them may be of any desired kind or type and form no part of this invention.

On the standards 2 there are mounted a pair of brackets 5, which project outwardly and are formed at their outer ends with the lower halves of bearings as indicated at 6, each adapted to receive a cap 7 forming the upper part of the bearing. Mounted in the bearings formed as described, are a pair of short shafts 8. Each of these shafts is provided at its outer end with an arm 9 and at its inner end carries a member 10 which is centrally mounted upon the shaft, and is provided with a pair of oppositely disposed square openings located equal distances from the axis.

Extending between the two members 10 are two parallel scraper bars 11 which at their opposite ends are mounted in the square openings of the members 10. These bars are preferably square so as to present an edge available for scraping the bars or sheet bars which pass between them, but the square shape is not absolutely essential as other shapes may be used which will provide a scraping edge that will in the apparatus function the same as the edge of a square bar.

These bars as will be seen, are spaced apart and they are positioned with respect to the rolls 4 so that they are symmetrical with respect to a horizontal plane which is tangent to the two rolls at their theoretical point of contact. Therefore, a metal bar or sheet bar passes between the bars 11 just prior to its introduction to a set of reducing or forming rolls.

The rolls 4 may be considered as forming a part of a series of pairs of rolls through which a bar or sheet bar is successively passed. It is customary and necessary in the operation of a series of rolls such as shown, that the bar or sheet bar being rolled be permitted to assume what is termed a loop shape, thus avoiding any tension on the bar or sheet bar as it passes through the rolls. The pair of scraping bars 11 arranged and mounted as heretofore described, are particularly adapted to meet the necessary conditions in scraping both sides of a bar or sheet bar when the same is passed between a series of rolls and assumes the loop form; that is to say, they may be caused to accommodate themselves to the looping of the bar or sheet bar, and still effectively perform their scraping function.

As will be seen from the drawings, the two oppositely disposed members 10 carrying the scraper bars 11 may be turned about their common axis so that the position of the bars 11 may be changed, and in practice the members 10, and therefore the bars 11, are turned so that the opening between the bars may be positioned to properly accommodate the bar or sheet bar which is being rolled without disturbing its looped condition.

The bars 11 may be operated or turned by any suitable means manually or automatically controlled. In this case I show a fluid pressure motor for operating the bars and allowing them to accommodate themselves to the looping of the piece being rolled with the bars maintained in contact or scraping relation to the surface of the piece.

In carrying out this part of the invention I mount on a separate base 12 in front of the mill, on which base other parts not material to the invention are ordinarily mounted, a fluid pressure motor 13 having a piston or plunger which is connected to a crosshead 14 which in turn is connected by a link 15 to a lever arm 16 secured to a lower rock shaft 17 between the ends of the latter. This rock-shaft which is supported in bearings carried by the base 12 has secured to its outer ends lever arms 18, and these are connected by links 19 to the arms 9, which as already described, are fixed to the outer ends of the upper short shafts 8 carrying the members 10 which support the parallel scraper bars 11.

With this mechanism, when the motor is operated the rock-shaft 17 is turned, and this movement is transmitted to the rotatable supporting members 10 carrying the scraper bars. Thus these bars will be brought to and maintained in scraping relation with the upper and lower surfaces of the bar or sheet bar being rolled, and an edge of each bar will scrape the scale or other adhering matter from the piece being rolled. This is done without in any way interfering with the loop form of the piece.

Having described my invention, I claim:

1. The combination with a pair of rolls of a rolling mill, of a pair of scraper bars extending lengthwise with respect to said rolls and in front of the same, common mountings for the adjacent ends of the bars, said mountings being pivotally supported on a common axis between the bars and actuating means connected to both said mountings to turn the same simultaneously about said axis.

2. The combination with a pair of rolls of a rolling mill, a pair of spaced scraper members extending lengthwise of the rolls and in front of the rolls, a supporting member adjacent each end of said scraper members to which the adjacent ends of the scraper members are secured, each of said supporting members being mounted to turn about an axis and the axes of both of said members being in alignment, and means for simultaneously applying equal force to both said supporting members to turn the same about their said axes.

3. The combination with a pair of rolls of a rolling mill, a pair of spaced upright members adjacent the opposite ends of the rolls, a shaft carried by each of said upright members, a pair of spaced scraper members extending lengthwise of the rolls, supporting means for the ends of said scraper members, said means being mounted upon the shafts before mentioned, and means for simultaneously turning the said shafts.

4. The combination with a pair of rolls of a rolling mill and their standards, of a pair of short shafts supported from said standards, the said shafts being in alignment, a supporting member carried at the inner end of each of said shafts, a pair of scraper bars the ends of which are mounted in said supporting members at equal distances from the common axis of said shafts, each of said shafts being provided with an arm, a shaft mounted below the first mentioned shafts, said last mentioned shaft having a pair of arms extending therefrom, and connected to the arms associated with the upper short shafts, and means for turning the lower shaft whereby the upper short shafts are simultaneously operated and in the same direction.

In testimony whereof, I hereunto affix my signature.

JOHN P. McCASLIN.